Oct. 2, 1945.   H. A. WILLIAMS   2,385,901
FLUID FLOW METER
Filed Nov. 18, 1943   3 Sheets-Sheet 1

INVENTOR.
Harry A. Williams
BY
Herbert M. Birch
ATTORNEY

Oct. 2, 1945.  H. A. WILLIAMS  2,385,901
FLUID FLOW METER
Filed Nov. 18, 1943  3 Sheets-Sheet 2

INVENTOR.
Harry A. Williams
BY
Herbert M. Birch
ATTORNEY

Oct. 2, 1945.  H. A. WILLIAMS  2,385,901
FLUID FLOW METER
Filed Nov. 18, 1943  3 Sheets-Sheet 3

INVENTOR.
Harry A. Williams.
BY
Herbert M. Birch
ATTORNEY

Patented Oct. 2, 1945

2,385,901

UNITED STATES PATENT OFFICE 2,385,901

FLUID FLOW METER

Harry A. Williams, Glenside, Pa., assignor to Bendix Aviation Corporation, Teterboro, N. J., a corporation of Delaware Application November 18, 1943, Serial No. 510,815

3 Claims. (Cl. 73—228)

The present invention relates generally to flow meters and more particularly to novel improvements in flow meters responsive to varying rates of fluid flow.

An object of the present invention is to provide a novel flow meter, whereby rate of fluid flow may be accurately determined from relatively low to relatively high rate of flow ranges.

Another object is to provide means for measuring rates of fluid flow through a variable orifice of novel configuration adapted to be constantly and progressively varied in proportion to fluid flow at either low or high range rates of flow, to thereby measure the rate of fluid flow therethrough.

Another object is to provide novel means in combination, whereby a relative length of the metering aperture is maintained substantially constant to prevent clogging, and yet varied in area in proportion to rates of fluid flow regardless of pressure in the conduit.

Another object is to provide an improved construction of novel design in vane-type flow meters or the like, combining accuracy, simplicity, economy and durability to facilitate mass production.

The above and other objects and advantages of the present invention will appear more fully hereinafter from a consideration of the detailed description which follows, taken together with the accompanying drawings wherein three embodiments of the invention are illustrated. It is to be expressly understood, however, that the drawings are for the purpose of illustration only and are not designed as a definition of the limits of the invention.

In the drawings wherein like reference characters refer to like parts throughout the several views.

Figure 1:
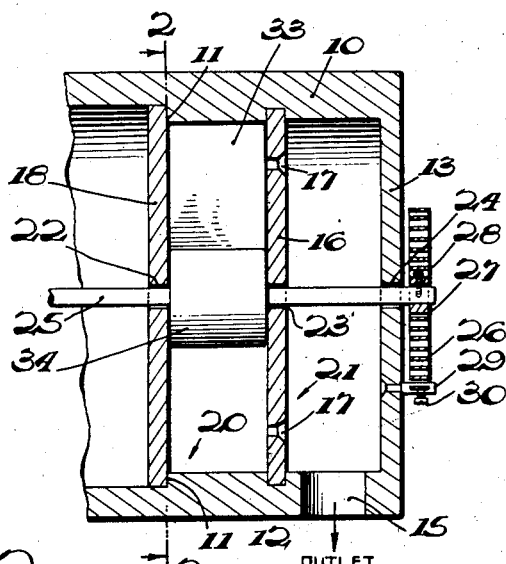
Figure 1 is a diagrammatic longitudinal section view of a flow meter of the class having a generally annular or arcuate orifice, which can readily utilize the novel construction and arrangement of parts shown in Figures 4–6.
Figure 2:
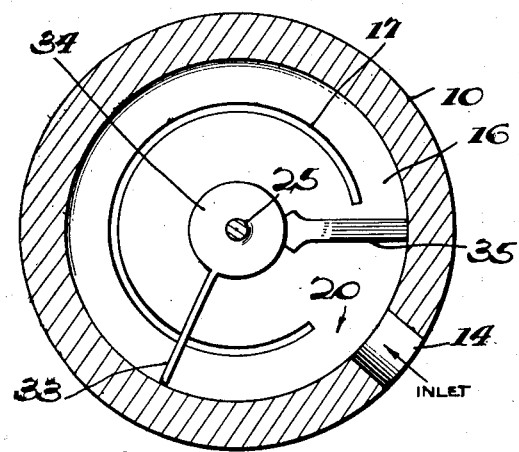
Figure 2 is a transverse sectional view taken along the line 2—2 of Figure 1.
Figure 3:
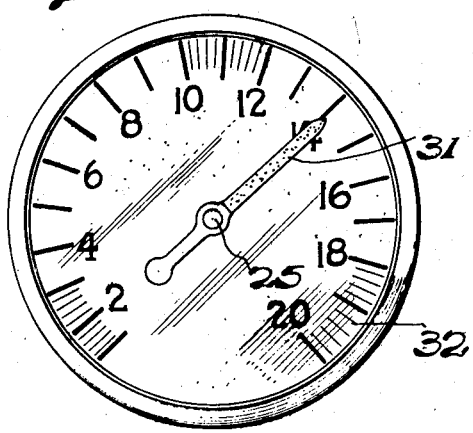
Figure 3 is an end elevational view of a typical form of indicator adapted to take-off rate of flow measurements.

Referring to the drawings in detail and particularly to Figures 1–3, there is shown a casing, such as cylinder 10 closed at one end by wall 13. Casing 10 is counter-bored to define a shoulder 11, bordering an annular section 12, adjacent the end wall 13.

The casing 10 is drilled through at two axially spaced points to define inlet and outlet openings 14 and 15 in annular section 12, and may be internally grooved intermediate the inlet and outlet openings to receive arcuately slotted plate 16 which is diagrammatically shown as cast-in.

Annular plate 16 contains a continuous arcuate, or generally, annular metering slot or orifice 17 nearly around its face and cooperates with an annular plate 18 secured or seated upon shoulder 11, as by a weld or rivets not shown, to define a metering chamber 20 with the inlet aperture 14 in casing 10.

The annular plates 16 and 18, and the casing end wall 13 are all arranged substantially parallel to each other, so as to define in addition to the measuring or inlet chamber 20, an outlet chamber 21 which communicates with outlet 15.

Each plate 16 and 18 and end wall 13 are centrally bored to define aligned apertures to receive bearings 22, 23 and 24 adapted to journal rotatable shaft 25, which extends longitudinally through and beyond the entire casing 10.

The shaft 25 beyond one end of the casing 10 has secured thereto the inner end of a coiled hairspring 26, such as by the bushing 27 and set screw 28. The outer end of the spring 26 is anchored to the outside of end wall 13 by block 29 and set screw 30. Spring 26 is so tensioned, as to develop a predetermined value of torque in yieldable opposition to any degree of torque developed by rotation of shaft 25, as hereinafter described, and is adapted to normally urge the vane 33 to a predetermined neutral position for zero indication. The shaft 25 extends through the outlet chamber 21 through and beyond inlet chamber 20 to any suitable take-off arrangement for giving indications of fluid flow, such for example, as pointer 31, which normally designates zero in the absence of fluid pressure on a cooperatively marked scale 32, shown in Figure 3.

Suitably secured or keyed to shaft 25 is a vane 33 adapted to rotate with shaft 25 around the inlet chamber 20. The vane 33 is arranged to provide a reasonably fluidtight fit within the annular inlet chamber 20, so as to by-pass fluid to be measured out of arcuate slot 17 in plate 16 from the fluid impact, or presser, side only of vane 33.

To further provide for such fluidtight arrangement, the vane 33 has an enlarged central hub portion 34, which fits closely against the end of a partition 35 fixed to the inner bore of casing 10 in chamber 20. The barrier or partition 35 extends inwardly from the annular bore of casing 10 adjacent the high rate metering end of metering slot 17 toward the center of the inlet chamber 20, until its end fits closely against a portion of the vane hub 34.

In operation, fluid flows through inlet 14 into that portion only of the metering chamber 20, which is bounded by plates 16 and 18, barrier or partition 35, vane hub 34 and the pressure side of vane 33. As the fluid flows into the metering chamber, the vane 33 is displaced in proportion to the force produced by the rate of fluid flow which force equals the balancing action of the torque of hairspring 26, and fluid passes out through the exposed part of arcuate slot 17 and outlet aperture 15.

The pressure exerted on the inlet side of vane 33 displaces the same in the direction of fluid flow to uncover a part of the arcuate or generally annular orifice 17. This causes shaft 25 to rotate and produce a driving torque in opposition to torque exerted by hairspring 26, until the torque transmitted by the vane 33 is balanced by the torque exerted by the hairspring 26, at which point the vane 33 has assumed its correct position to indicate the instantaneous rate of fluid flow. With each change of the rate of flow, the vane 33 assumes a new position, and increases or decreases the extent of exposure of annular slot 17 to measure rate changes. Obviously, as the end of shaft 25 carries the pointer 31, indications of the true rate of fluid flow will be given on scale 32, when the hairspring torque balances the torque produced by rate of fluid flow.

Figure 4:
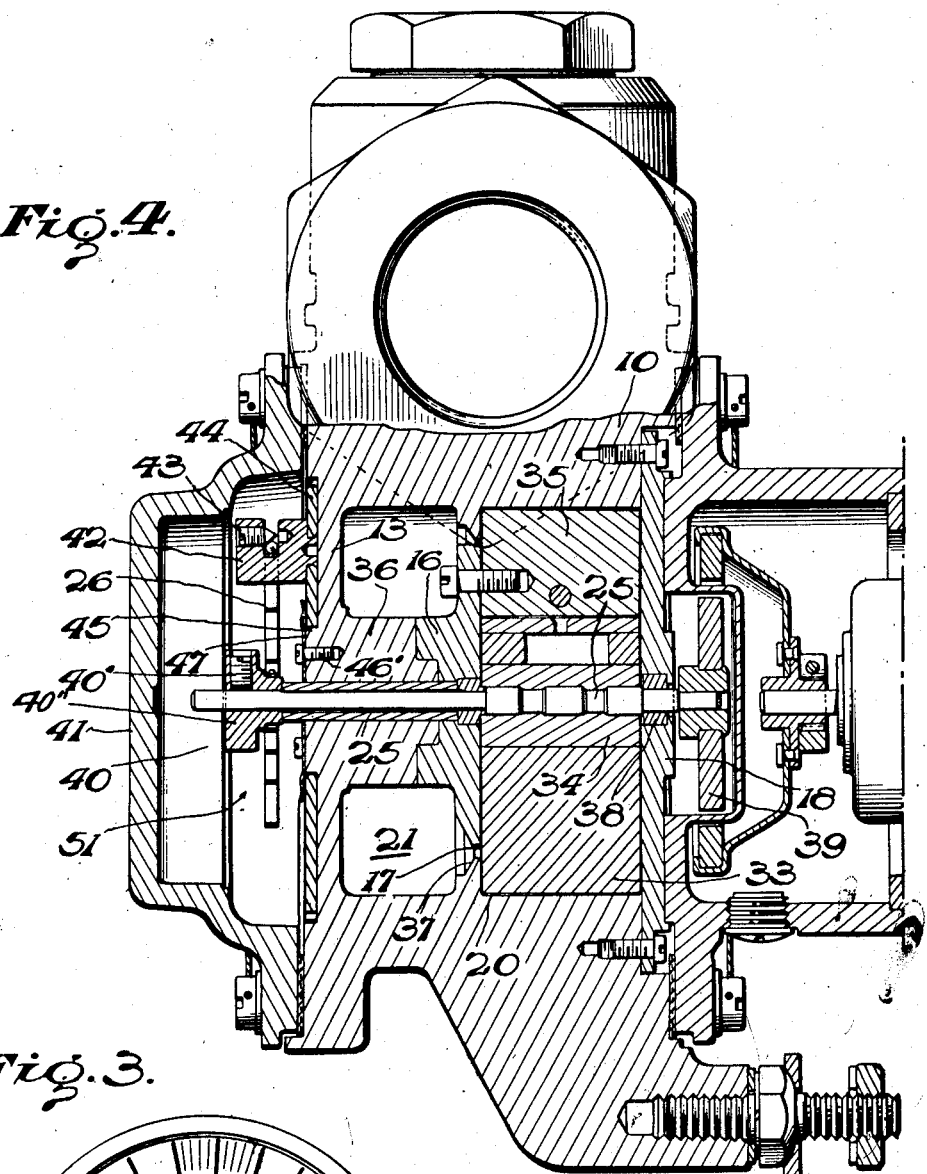
Figure 4 is a sectional view of the preferred embodiment of the invention.

Figure 4 shows the preferred embodiment of the invention, which involves constructional features for the generally annular orifice flow meters of Figures 1, 2, and 7, 8. In this form, the casing 10 is cast and the outlines of metering and outlet chambers 20 and 21 are turned-machined therein. The end wall 13 of casing 10 has an inwardly extending boss 36 which is suitably drilled to form a receptive aperture for journalling shaft 25 therein, over which engages plate 18 common to both the metering chamber 20 and outlet chamber 21, to thereby cooperate with the upstanding annular flange 37 and provide an arcuate metering slot 17. The plate 16 is secured to partition 35, that is attached to plate 18 and which extends inwardly into fluidtight connection with vane hub 34, which is keyed or otherwise secured to shaft 25, being shown as cast on, and held against longitudinal thrust by plate 18 of metering chamber 20. Partition 35 is held in place against angular movement, e. g. either by the clamping action of plate 18 or by screws (not shown) fastening plate 16 to boss 36. The vane 33 is shown inserted in a slot in hub 34 which is shown, above the shaft, as provided with balancing holes and counterweights for the vane. A pin stop for the vane is also shown in partition 35 a little above the hub.

Shaft 25 extends through plate 18 in a suitable bushing or bearing 38, and carries thereon a magnetic clutch element, such as permanent magnet 39 adapted to drive a remote indicating system such as is shown and described in co-pending application Serial No. 505,990, filed October 12, 1943, and assigned to the assignee of the present invention.

The shaft 25 extends from beyond the other end of casing 10 into a spring chamber 40 defined by casing end wall 13 and flanged cup 41. The hairspring 26 is secured at the inner end to shaft 25 by screw 40' for hub 40'' and at the outer end of the coil in a block 42 by a short piece of cylindrical wire contacted by set screw 43, block 42 being riveted to a centrally apertured gear 44. Gear 44 is rotatable about an annular projection 45 from the end wall 13 of casing 10 and detachably secured thereon by suitable means, such as bolts 46 and spring plate 47.

Figure 6:
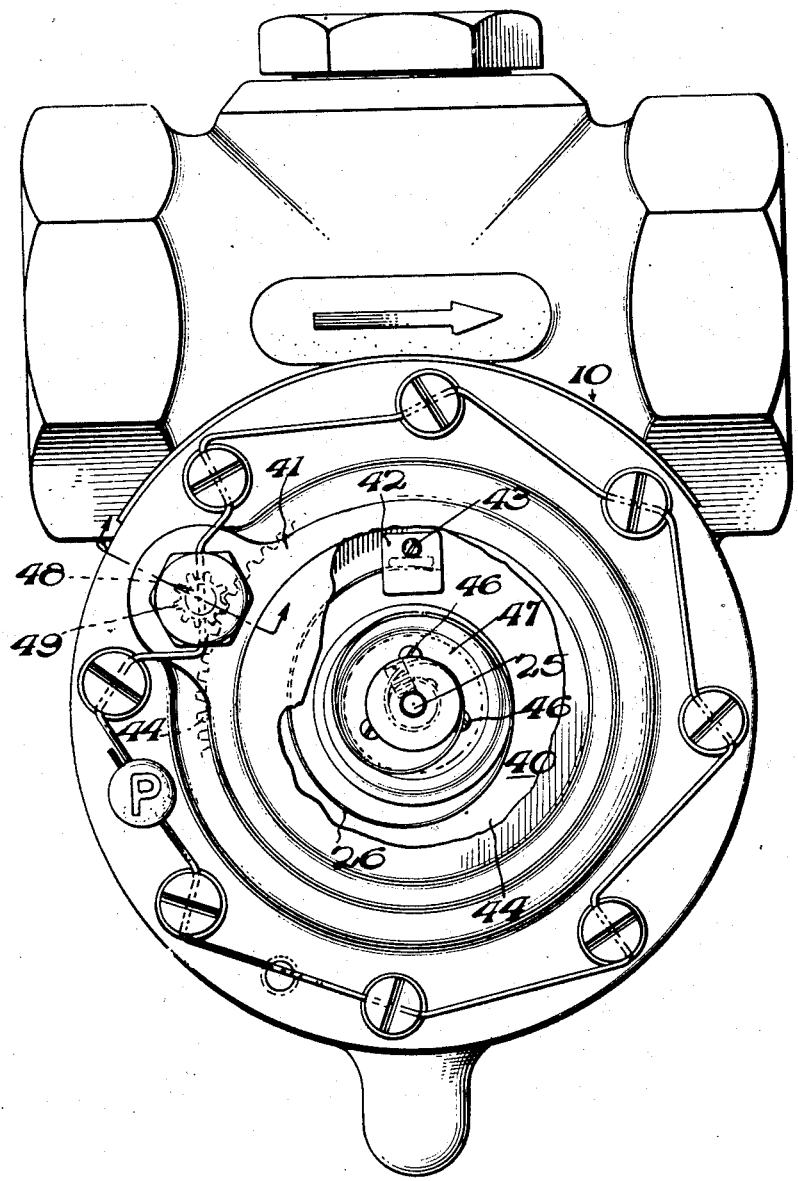
Figure 6 is an end elevation view of the device of Figure 4 partly broken away of the coil spring chamber.
Figure 5:
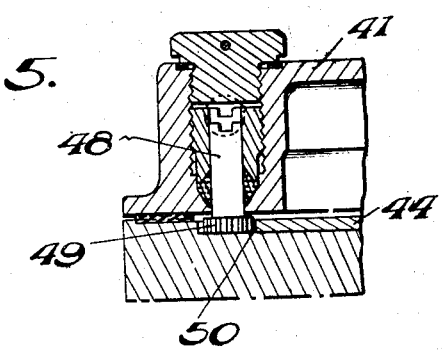
Figure 5 is a detail in cross section of one means for hairspring adjustment, such as may be used with the present invention.

Extending through the flanged cup 41 is a pinion shaft 48 (see Figures 5 and 6) carrying a pinion gear 49 in mesh with the teeth 50 of gear 44, adapted to be rotated by a suitable tool to set the hairspring 26 to proper metering tension. There is a packing around shaft 48 which a removable sealing plug overlies.

In operation, this form of the invention is generally the same as that described in connection with Figures 1, 2 and 3 except that the actual readings or recordings of flow rates are transmitted to a remote point through the magnetic coupling magnet as described in the above mentioned application.

In the following description of the modification shown in Figures 4–8 of the present invention, because of its similar construction to the form shown in Figures 1, 2 and 3, all like parts are given the same reference numerals and the changes only are referred to by new numerals.

Figure 8:
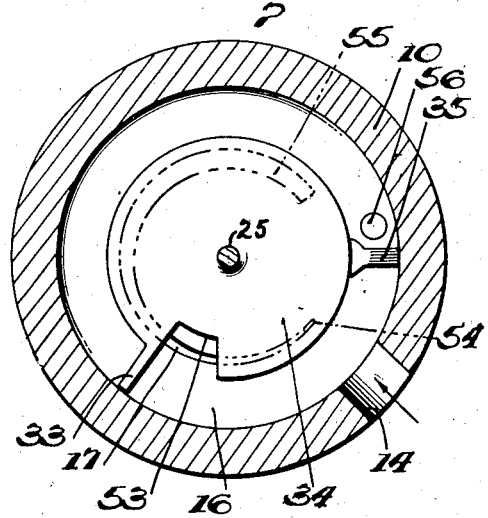
Figure 8 is a transverse sectional view taken along the line 8—8 of Figure 7.
Figure 7:
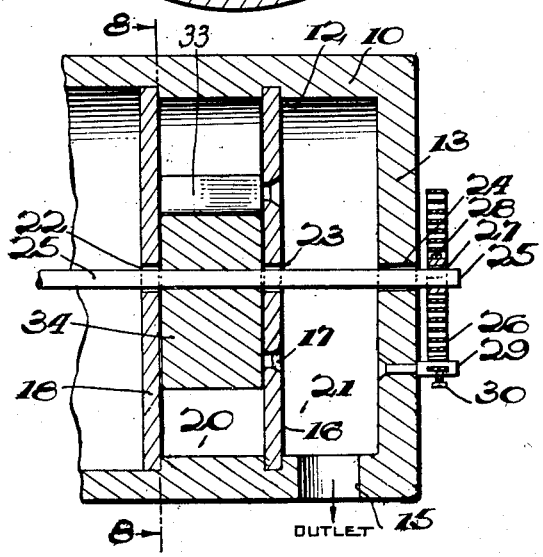
Figure 7 is a diagrammatic longitudinal section view of the embodiment of the present invention shown in Figures 4–6.

Referring in detail to Figures 7 and 8, wherein the invention is diagrammatically illustrated, provision is made for high constancy of accuracy at low flow rates.

This form includes a casing, such as cylinder 10, closed at one end by wall 13. Casing 10 is counter-bored to define a shoulder 11 bordering an annular section 12, adjacent wall 13.

The casing cylinder 10 is drilled through at two axially spaced points to define inlet and outlet openings 14 and 15 in annular section 12, and may be internally grooved intermediate the inlet and outlet openings to receive an arcuately slotted metering plate 16 which is diagrammatically shown as cast-in.

The arcuate slot 17 in plate 16 differs from the prior forms described in that it is of progressively varying width.

The annular plates 16 and 18, and cylinder end wall 13 are all arranged substantially parallel to each other, so as to define a measuring or inlet chamber 20 having inlet 14, and an outlet chamber 21 having outlet 15.

Each plate 16 and 18 and end wall 13 are centrally bored to define aligned apertures to receive bushings 22, 23 and 24 to thereby journal rotatable shaft 25, which extends longitudinally through and beyond the entire casing 10.

The shaft 25 beyond one end of the casing 10 has secured thereto the inner end of a coiled hairspring 26, such as by the bushing 27 and set screw 28. The outer end of the spring 26 is anchored to the outside of end wall 13 by block 29 and set screw 30. Spring 26 is so tensioned as to develop a predetermined value of torque in opposition to any degree of torque developed by rotation of shaft 25, as hereinafter described.

The shaft 25 extends through the outlet chamber 21 through and beyond inlet chamber 20 to any suitable take-off arrangement for giving indications of fuel flow, such for example, as pointer 31 and cooperatively marked scale 32, shown in Figure 3. Alternatively as in the form shown in Figures 4 through 6, the pointer 31 may be replaced by a telemetric transmitter means.

Suitably secured or keyed to shaft 25 is a vane 33 adapted to rotate with shaft 25 around the inlet chamber 20. The vane 33 is arranged to provide a reasonably fluid tight fit within the annular inlet chamber 20, so as to by-pass fluid to be measured out of progressively variable widths of arcuate slot 17 in plate 16 from the fluid impact side only of vane 33.

To further provide for such fluid tight arrangement, and to provide a constant length of arcuate slot exposure at all positions of vane 33, the vane 33 has an enlarged mutilated hub portion 34, Figure 8, which fits closely against partition 35. The barrier or partition 35 extends inwardly from the annular bore of casing 10 adjacent the high rate metering end of metering slot 17 toward the center of the inlet chamber 20, until its end fits closely against a solid portion of the vane hub 34.

Particular attention is directed at this point to the novel construction and arrangement of the mutilated hub 34 with respect to the progressively widening metering slot 17 in plate 16. Hub 34 is mutilated to provide a channel 53 and is made relatively larger radially than metering slot 17 on either side of channel 53, so that upon rotation of the hub 34 only one length of slot may be exposed regardless of whether the flow rate is low or high. The varying rates of flow, however, are accurately measured due to the variable width of the slot 17, which as shown in Figure 8 is relatively restricted in width at the low rate metering end 54 of arcuate slot 17 with respect to the high rate metering end 55 of the slot.

To further procure accuracy of operation, metering plate 16 is provided with a small bleed aperture 56 near the partition 35 outside the metering slot 17 and circumference of hub 34. The aperture 56 serves to prevent any compression of fluid, such as air back of vane 33, that would result in objectionably large back pressures, and which would temporarily interfere with the action of the calibrated hairspring 26.

In operation, fluid flows through inlet 14 into that portion only of the metering chamber 20, which is bounded by plates 16 and 18, barrier or partition 35, vane hub 34 and the pressure side of vane 33. As the fluid flows into the metering chamber, the vane 33 and hub 34 are displaced in proportion to the force produced by the rate of fluid flow and the balancing action of the torque of hairspring 26, so that part of arcuate slot 17 is exposed by the channel 53 in hub 34 and the fluid passes out through aperture 15.

The pressure exerted on the inlet side of vane 33 displaces the hub 34 in the direction of fluid flow to uncover the part of annular orifice 17 in alignment with channel 53. This accordingly, causes vane 33 to rotate and produce a driving torque to shaft 25 in opposition to torque exerted by hairspring 26, until the torque transmitted by the vane 33 is balanced by the torque exerted by the hairspring 26, at which point the vane 33 has assumed its correct position to indicate the fluid rate of flow. With each change of the rate of flow, the vane 33 and channel 53 in hub 34 have assumed a new position, so as to expose a different width of annular slot 17 to measure such rate changes.

There are thus provided novel and useful improvements in flow meters of the class described. The construction of the device is simple and automatic in operation, light in construction and is arranged to maintain constantly accurate measurements of changing fluid flow rates in either low or high ranges.

Although only two embodiments of the invention have been illustrated in Figures 1 to 8, inclusive, and described in detail, it is to be expressly understood that the same is not limited thereto. Various changes may be made in the design and arrangement of the parts illustrated, as will now be apparent to those skilled in the art. For a definition of the invention, reference will be had primarily to the appended claims.

I claim:

1. A fluid flow meter comprising a casing having an inlet, an outlet and an arcuate slot of progressively changing width between the inlet and outlet, a vane having a mutilated hub adapted to cover all but a substantially constant length of the slot, said hub being of relatively larger diameter than that of the arcuate opening defined by said slot, means adapted to rotatably mount said vane in said casing, and resilient means associated with said means adapted to produce variable torque in opposition to the torque produced in the said first means in the direction of fluid flow according to rates of flow to thereby expose different radial widths of said annular slot according to the difference between said torques developed by varying rates of fluid flow.

2. Means for determining low rates of fluid flow comprising a metering chamber, reactive means in said chamber comprising a movable wall mounted in fluid tight relation with the sides of said metering chamber, a fluid inlet to said chamber upstream of said movable wall, means adapted to exert a counter-force in opposition to fluid pressure on the movable wall, a continuous arcuate slot of varying width in a side of the metering chamber, and means carried by said movable wall adapted to expose portions of constant length of said arcuate slot on the upstream side only of said movable wall, whereby fluid is passed through said exposed portions of said slot according to the rate of fluid flow.

3. A fluid flow meter comprising a cast block having an inlet and an outlet for the flow and a generally cylindrical portion with axially spaced connections respectively to the inlet and outlet, with an outer wall at one end of the block; the interior of the cylindrical portion being turn-machined to provide a central boss on the wall, a radially inwardly extending annular rib intermediate said inlet and outlet connections, and an outer cylindrical portion having the outer end open; a shaft; said boss having a drilled hole journalling said shaft coaxially of said cylindrical portion and of said annular rib; an orifice plate having a portion coaxial of said shaft and said boss and secured to said boss, said plate having a maximum radius less than the inner radius of said rib to form therebetween a generally arcuate orifice between said inlet and outlet; an end plate attached to the block to close the end of said outer cylindrical portion and having a concentric hole journalling said shaft; a metering vane member secured to the shaft to move adjacent said end plate, the inside of said outer cylindrical portion and the orifice on the outer side of said rib and orifice plate and having a generally cylindrical hub portion; a member within said outer cylindrical portion and shaped to closely fit therein against the end plate, cylindrical wall, rib, orifice plate and the cylindrical hub portion, and adapted to be fixed adjacent the stated flow connection of the outer cylindrical portion; and a spring attached to said shaft to variably oppose its turning.

HARRY A. WILLIAMS.